Dec. 13, 1955  R. L. GUENTNER ET AL  2,727,156
X-RAY APPARATUS
Filed March 4, 1953  2 Sheets-Sheet 1

INVENTORS
Robert L. Guentner and
Raymond K. Jenny
BY
F. E. Browder
ATTORNEY

INVENTORS
Robert L. Guentner and
Raymond K. Jenny

United States Patent Office 2,727,156
Patented Dec. 13, 1955

2,727,156

X-RAY APPARATUS

Robert L. Guentner, Baltimore, and Raymond K. Jenny, Glen Burnie, Md., assignors to Westinghouse Electric Corporation, East Pittsburgh, Pa., a corporation of Pennsylvania Application March 4, 1953, Serial No. 340,206

4 Claims. (Cl. 250—92)

This invention relates to X-ray apparatus, and more particularly to an improved locking device for the X-ray tube support assembly.

It is an object of our invention to provide an improved friction locking device for the X-ray tube support assembly of an X-ray apparatus.

It is another object of our invention to provide an improved friction locking device, which will not place undue stress upon or deform the locked member.

It is another object of our invention to provide an improved friction device, which will not place undue stress upon or deform an arcuate member, which is a part of the tube support assembly of an X-ray apparatus.

It is another object to provide an improved restraining device of the friction clamp type, which functions as a double direction self-energizing restraining device for locking an X-ray tube support assembly in a fixed position.

These and other objects are effected by our invention as will be apparent from the following description and claims taken in accordance with the accompanying drawings throughout which like reference characters indicate like parts and in which:

Figure 1:
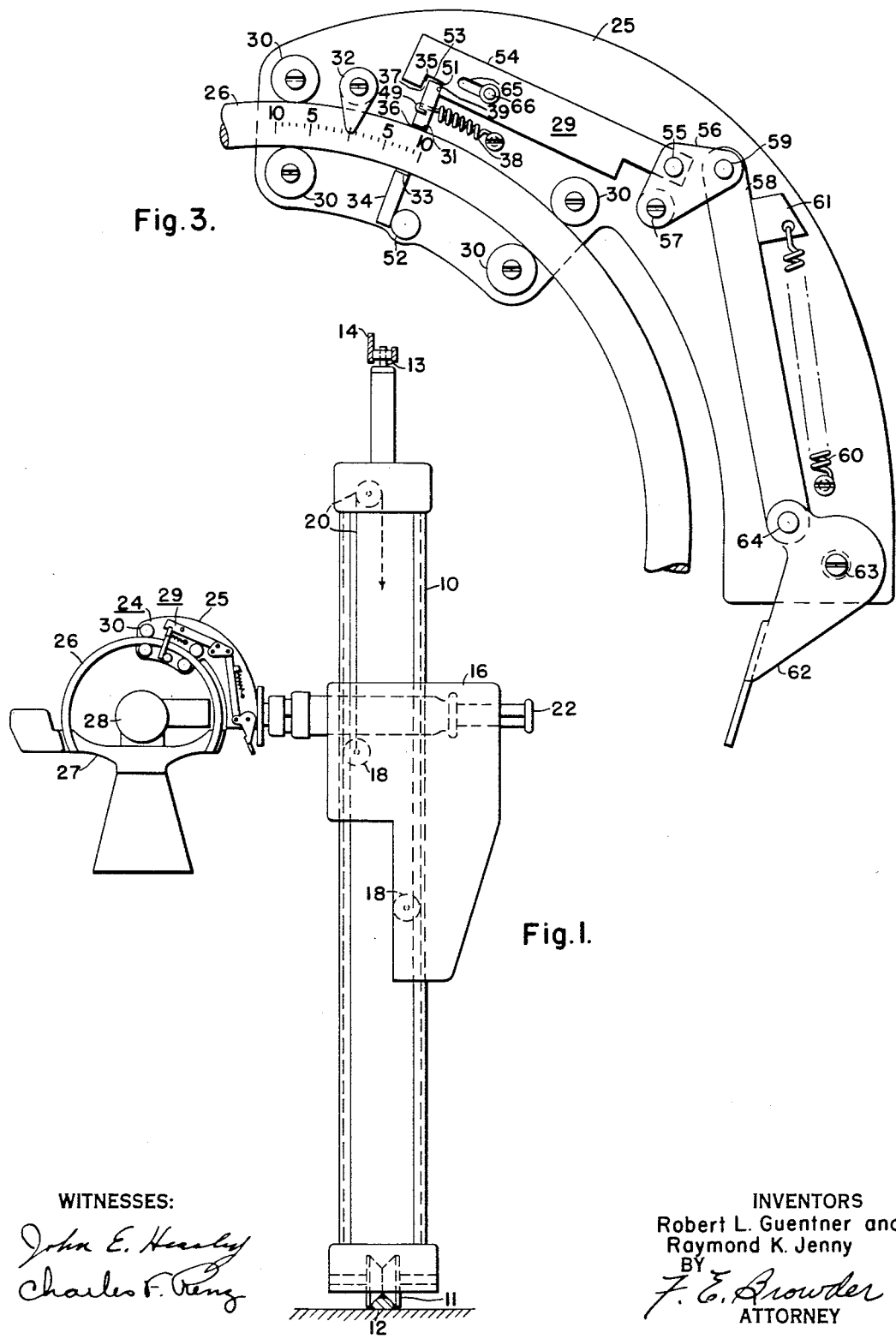
Figure 1 is a side elevational view of an X-ray tube stand incorporating our invention.

Referring in detail to Fig. 1, there is shown a floor-to-ceiling type X-ray tube stand having an upright column 10 supported by rollers 11 for movement along a floor track 12. A bracket 13 attached to the top of the upright column 10 supports it for movement along a channel 14. A tube carriage 16 is attached to the upright column 10 by means of rollers 18, which are retained in channels within the upright column 10. A counterweight is attached to the tube carriage 16 by means of a pulley arrangement 20, thereby allowing ease of movement of the carriage 16 along the upright column 10.

A horizontal arm 22 is attached to the tube carriage 16, and a tube support assembly 24 is attached to the arm 22. The horizontal arm 22 is so constructed that the tube assembly 24 may be moved in a horizontal direction and also to permit rotation of the tube support assembly 24 about a horizontal axis coincident with the axis of the horizontal arm 22.

The tube support assembly 24 comprises a support bracket 25, an arcuate member 26, a tube holder 27, an X-ray tube 28 and a locking mechanism 29. The support bracket 25 is mounted to the horizontal arm 22. The locking mechanism 29 is attached to the support bracket 25, while the arcuate member 26 is retained and supported for movement by means of rollers 30 which are mounted to the tube support bracket 25. The tube holder 27 has its end portions fixed to the ends of the arcuate member 26 so that the holder 27 forms a bridge connecting the ends of the arcuate member. The X-ray tube 28 is fixed to the tube holder 27. For the sake of simplicity, only one arcuate member 26 and one set of rollers 30 are shown in the drawings. In actual practice, to effect stability, a second arcuate member and a second set of rollers, parallel to and laterally displaced from those shown, are used.

Figure 2:
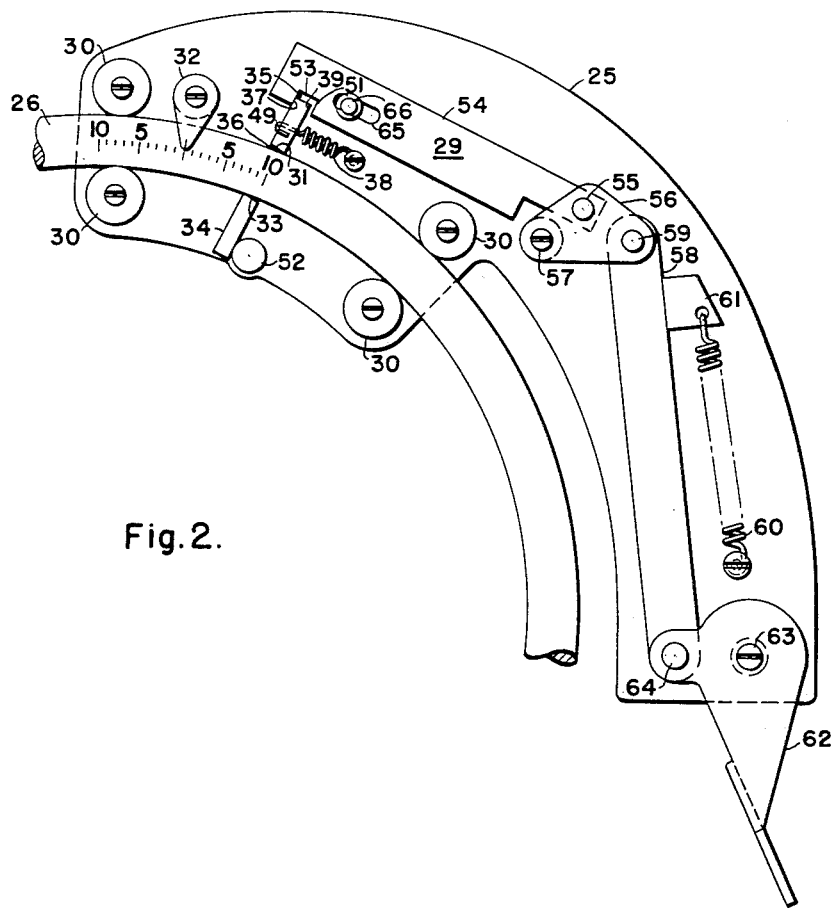
Fig. 2 is a detailed side elevation of a tube support bracket showing a preferred embodiment of the locking device of our invention in the latched position; and, Fig. 3 is a view similar to that of Fig. 2, but showing the locking device in the released position.

Referring in detail to Figs. 2 and 3, there is shown the tube support bracket 25, the locking mechanism 29 and the arcuate member 26. The locking mechanism 29, which is attached to the tube support bracket 25 comprises a clamping bar 34 having an opening 36 through which the arcuate member passes. A tension spring 38, which is attached at one end to the clamping bar 34, at a point 49, above the opening 36 and at the other end to the tube support bracket 25, inclines the clamping bar 34 clockwise, causing surfaces 31 and 33 of the opening 36, or portions of those surfaces, to engage the arcuate member 26.

A pin 52 is fixed to the tube support bracket 25 in a position such that when a clamping bar 34 is in the engaged position, the lower extremity of the clamping bar 34 will bear against the pin 52 to restrain clockwise movement of the clamping bar 34. Since the clamping bar 34 is engaged with the arcuate member 26, clockwise movement of the arcuate member 26 will also be restrained. Any force applied to the arcuate member 26 in a direction tending to cause it to move clockwise, will cause a force in the clockwise direction to be applied by the pin 52 to the clamping bar 34. As a result, the friction between the clamping bar surfaces 31 and 33 and the arcuate member 26 will be increased as a function of the applied force, causing the arcuate member 26 to be, in effect, locked against the clockwise movement.

A control linkage means comprising an engaging link member 54, a bell crank member 56, a connecting link member 58, a connecting link spring 60, and a control lever 62, serves to restrain counterclockwise movement of the arcuate member 26 and also to disengage the clamping bar 34 from the arcuate member 26.

The control lever 62 is attached to the tube support bracket 25 by means of a pin 63 so as to allow the control lever 62 to rotate about the pin 63. The connecting link member 58 has its lower end pivotally attached by pin 64 to the control lever 62 so that a movement of the control lever 62 will exert a longitudinal force on the connecting link 58. A tension spring 60 is attached at one end to the tube support bracket 25 and at the other end to a projection 61 on the connecting link member 58 so that the tension of the spring 60 will exert a downward longitudinal force on the connecting link member 58.

The bell crank member 56 is pivoted on pin 57 which is fixed to the tube support bracket 25. The upper end of the connecting link member 58 is pivoted on pin 59 which is fixed to the bell crank member 56 and displaced from the bell crank pivot pin 57. The engaging link member 54 is pivoted at its lower end on a pin 55 which is fixed to the bell crank at a point displaced from the bell crank pivot pin 57 and the connecting link pivot pin 59. The bell crank member 56 allows a longitudinal force applied by the connecting link member 58 to be transmitted into a longitudinal force on the engaging link member 54.

The engaging link member 54 has a longitudinal slot 65 near its upper end. A pin 66 fixed to and protruding from the tube support member 25, passes through the slot 65, and has suitable means on its extremity to prevent escape of the engaging link member 54 from the pin 66. The slot 65 allows the engaging link member 54 to move in a longitudinal direction. A recess 53 is provided on the underside of the engaging link member 54 near its upper end, to receive the upper extremity of the clamp bar 34.

A position indicating scale is located on the arcuate member 26 with a pointer 32 attached to the tube support bracket 25, so as to indicate the relative position of the arcuate member 26 with respect to the tube support bracket 25.

The locking mechanism 29 is normally in the restrained or locked position as shown in Fig. 2. The tension of the connecting link spring 60 applies a downward longitudinal force on the connecting link member 58 so as to move the connecting link member 58 downward. The downward movement of the connecting link member 58 rotates the bell crank member 56 in a clockwise direction about its pivot point 57. The clockwise rotation of the bell crank member 56 moves the engaging link 54 downward in a longitudinal direction. The downward movement of the engaging link member 54 engages the surface 35 of the recess 53 with the surface 37 of the clamping bar 34 to restrain counterclockwise movement of the clamping bar 34, and also to exert a clockwise force on the clamping bar 34. This force causes portions of the surfaces of the clamping bar opening 36 to engage the arcuate member 26. The pin 52 bears against the lower extremity of the clamping bar 34, restraining clockwise motion of the clamping bar 34, and as a clockwise force is applied to the arcuate member 26, the pin 52 will exert an increased clockwise force on the clamping bar 34, thereby increasing the frictional engagement between clamping bar 34 and arcuate member 26 as a function of the applied force. Thus the arcuate member is locked against clockwise movement. The tension of the connecting link spring 60 will restrain counterclockwise movement of the clamping bar 34, and if a counterclockwise force is applied to the arcuate member 26, the tension of the connecting link spring 60 will exert an increased clockwise force on the clamping bar 34, which increases the frictional engagement between the clamping bar 34, and the arcuate member 26 as a function of the force applied. Thus, the arcuate member is locked against counterclockwise movement to a degree depending upon the amount of force required to overcome the tension of the connecting link spring 60. The tension of the connecting link spring 60 may be adapted to the requirements of the apparatus.

To release the locking mechanism 29, the control lever 62 is moved in a clockwise direction, thereby exerting an upward longitudinal force on the connecting link member 58. The force applied by the control lever 62 overcomes the tension of the connecting link spring 60, thereby allowing the linkage system to apply a counterclockwise force on clamping bar 34, by engaging the surface 51, of the recess 53, with the surface 39 of the clamping bar 34. The counterclockwise force, which is applied to the upper extremity of the clamping bar 34, aided by the tension spring 38, rotates the clamping bar 34 counterclockwise so as to disengage the clamping bar 34 from the arcuate member 26. The arcuate member 26 is now free to move within the rollers 30, with respect to the tube support bracket 25.

The clamping bar 34 rides or floats on the arcuate member 26, so that when the arcuate member 26 is locked and a force is exerted on the arcuate member 26, the external force is nearly all transmitted through the bar 34 with minimum strain on the rollers 30 and the arcuate member 26.

While we have shown our invention in a single form it will be obvious to those skilled in the art that it is not so limited, but is susceptible to various other changes and modifications without departing from the spirit and scope thereof.

We claim as our invention:

1. In X-ray apparatus, a tube stand including a vertical column, a horizontal tube support assembly attached to said vertical column, said tube support assembly comprising a tube support bracket attached to said horizontal arm, an arcuate member attached to said tube support bracket so as to allow movement of said arcuate member with respect to said support bracket, an X-ray tube attached to said arcuate member, a clamping bar attached to said tube support bracket and provided with an opening in which said arcuate member is receivable and slidable, a spring connected between said clamping bar and said support bracket for holding said clamping bar in a position to effect engagement of portions of the surface of said opening with said arcuate member and prevent movement of said arcuate member, a pin fixed to and projecting from said support member so as to engage said clamping bar for restraining clockwise movement of the engaged combination of said arcuate member and said clamping bar, a link member having a recess engaging the other extremity of said clamping bar, means for applying a force on said clamping bar by said link member to restrain counterclockwise movement of the engaged combination of said arcuate member and said clamping bar, and means for applying a force on said clamping bar by said link member so as to overcome the force of said spring to disengage said arcuate member and said clamping bar.

2. In X-ray apparatus comprising a tube stand including a vertical column, a horizontal tube support arm attached to said vertical column, a tube support assembly attached to said horizontal arm, said tube support assembly comprising a tube support bracket attached to said horizontal arm, an arcuate member attached to said tube support bracket so as to allow movement of said arcuate member with respect to said support bracket, an X-ray tube attached to said arcuate member, a clamping bar attached to said tube support bracket and having an opening in which said arcuate member is receivable and slidable, a spring for holding said clamping bar in a position to effect engagement of said arcuate member with at least a portion of the surface of said opening and prevent movement of said arcuate member, a pin fixed to and projecting from said support bracket so as to engage the lower extremity of said clamping bar for restraining clockwise movement of said clamping bar, a link member having a recess engaged in the upper extremity of said clamping bar, means for exerting a force consisting of the tension of a second spring along the longitudinal axis of said link member on said clamping bar to restrain counterclockwise movement of said clamping bar.

3. In X-ray apparatus comprising a tube stand including a vertical column, a horizontal tube support attached to said vertical column, a tube support assembly attached to said horizontal arm, said tube support assembly comprising a tube support bracket attached to said horizontal arm, an arcuate member attached to said tube support bracket so as to allow movement of said arcuate member with respect to said support bracket, an X-ray tube attached to said arcuate member, a clamping bar attached to said tube support bracket and having an opening in which said arcuate member is receivable and slidable, a spring for holding said clamping bar in a position to effect locking engagement of said arcuate member with at least a portion of the surface of said opening of said clamping bar, a pin fixed to and projecting from said support bracket so as to engage the lower extremity of said clamping bar, an engaging link member having a recessed portion near the extremity of said engaging link member for restraining the upper extremity of said clamping bar, a bell crank member connected to the other extremity of said engaging link member, a connecting link member with one extremity connected to the other arm of said bell crank member, a connecting link spring connecting to a protruding portion of said connecting link member so as to apply longitudinal force along the connecting link member which is transmitted through said bell crank member to said engaging link member so as to restrain counterclockwise movement of said clamping bar with respect to said support bracket, control lever means connected to the other extremity of said connecting link member so as to exert a longitudinal force opposite to that of said connecting link spring to overcome the restraining force applied by said connecting link spring and said clamping bar spring to allow said arcuate member to slide in the opening of said clamping bar.

4. In X-ray apparatus, a tube stand including a vertical column, a horizontal tube support assembly attached to said vertical column, said tube support assembly comprising a tube support bracket attached to said horizontal arm, an arcuate member attached to said tube support bracket so as to allow movement of said arcuate member with respect to said support bracket, an X-ray tube attached to said arcuate member, a clamping bar provided with an opening in which said arcuate member is receivable and slidable, a spring for biasing said clamping bar in a position to effect engagement of portions of the surface of said opening with said arcuate member and prevent movement of said arcuate member, a pin fixed to and projecting from said support member so as to engage said clamping bar for restraining clockwise movement of the engaged combination of said arcuate member and said clamping bar, a link member having a recess engaging the other extremity of said clamping bar, means for applying a force on said clamping bar by said link member to restrain counterclockwise movement of the engaged combination of said arcuate member and said clamping bar, and means for applying a force on said clamping bar by said link member so as to overcome the force of said spring to disengage said arcuate member and said clamping bar.

References Cited in the file of this patent

UNITED STATES PATENTS

| Number | Name | Date |
|---|---|---|
| 981,256 | Fullerton | Jan. 10, 1911 |
| 1,431,578 | Garretson | Oct. 10, 1922 |
| 1,617,028 | Rekar | Feb. 8, 1927 |
| 1,853,517 | Finnerty | Apr. 12, 1932 |
| 2,049,807 | Horsley | Aug. 4, 1936 |
| 2,169,875 | Fanning | Aug. 15, 1939 |
| 2,595,260 | Hollstein | May 6, 1952 |

FOREIGN PATENTS

| Number | Country | Date |
|---|---|---|
| 114,678 | Sweden | Aug. 14, 1945 |